May 18, 1948. H. KERSHAW 2,441,886
WELDING MACHINE
Filed Nov. 26, 1946 4 Sheets-Sheet 1
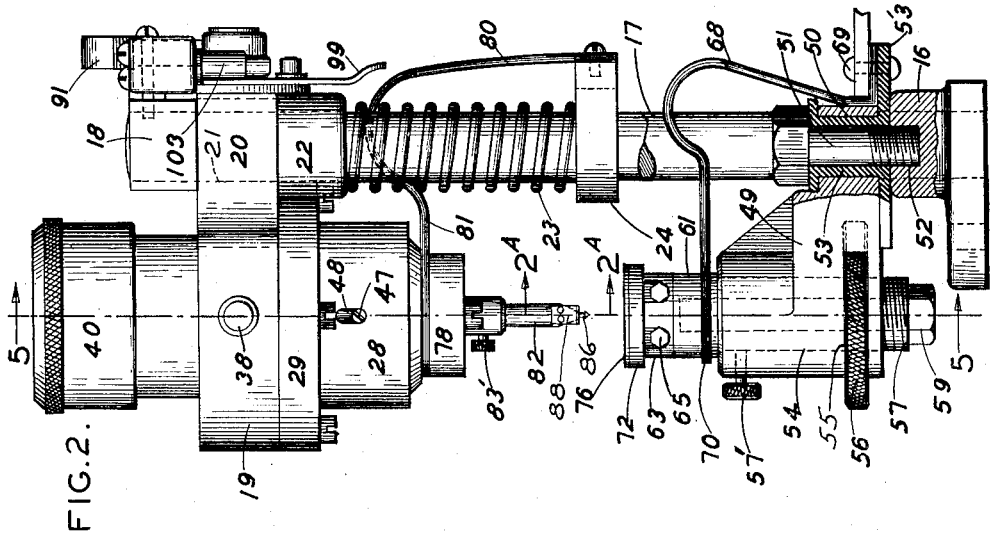
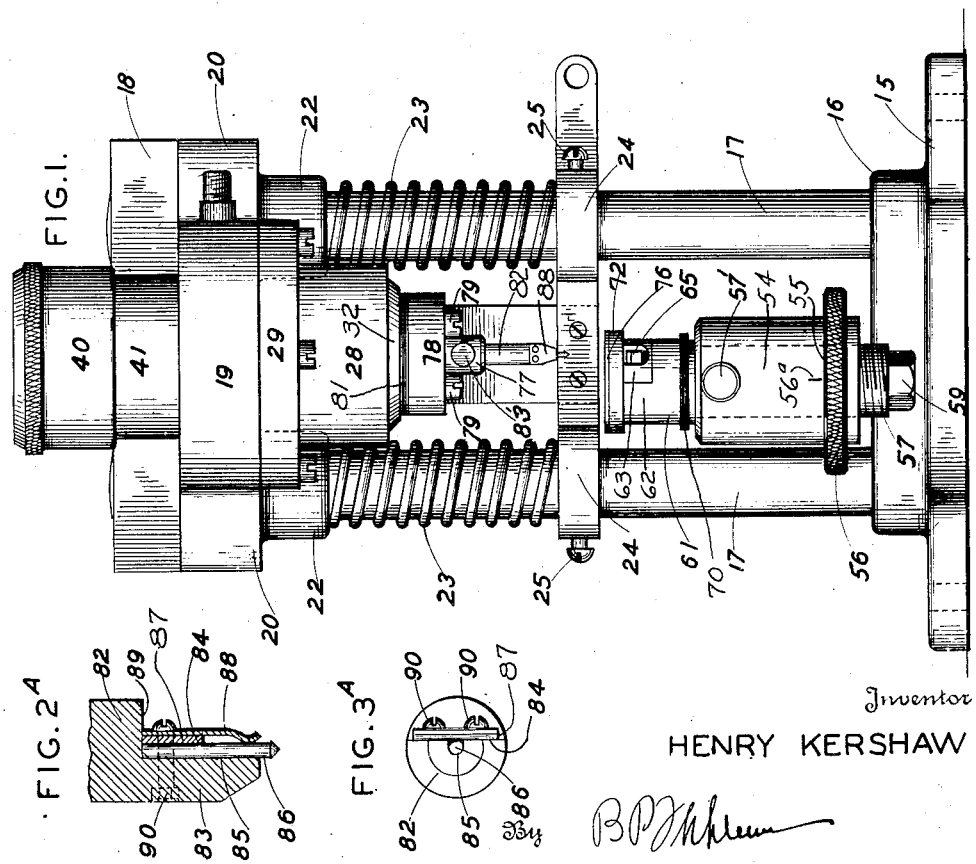
Inventor
HENRY KERSHAW

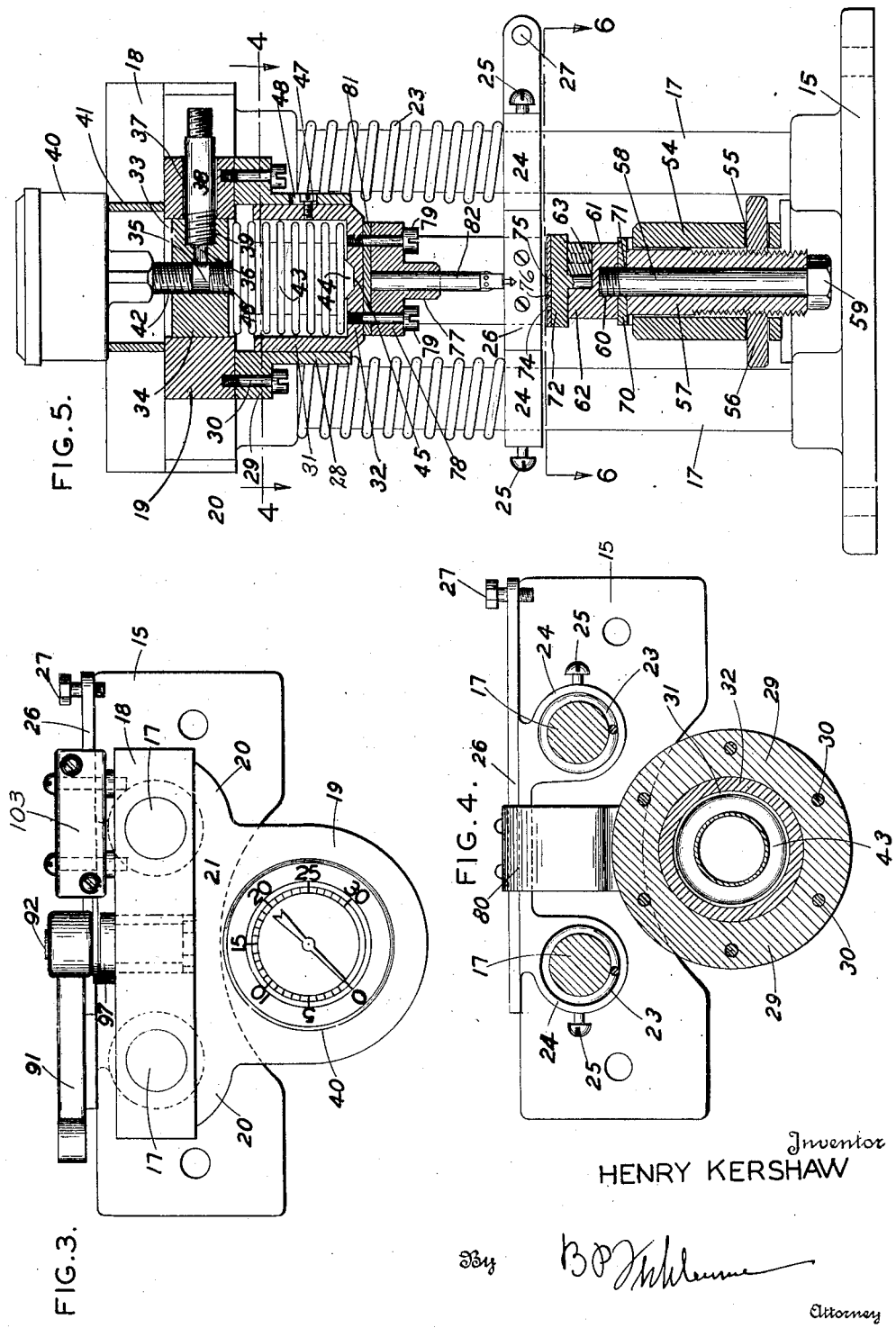

May 18, 1948. H. KERSHAW 2,441,886
WELDING MACHINE
Filed Nov. 26, 1946 4 Sheets-Sheet 3
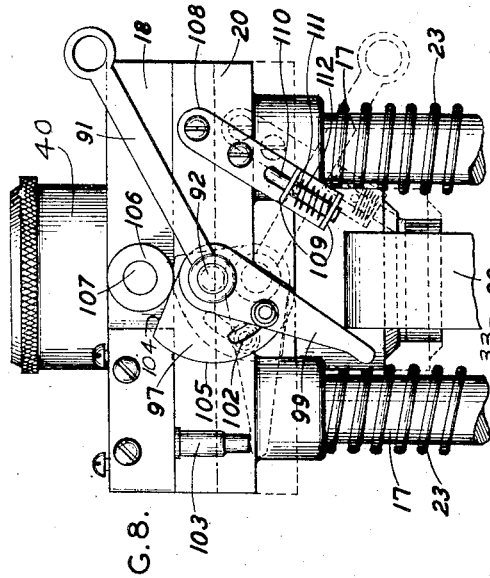
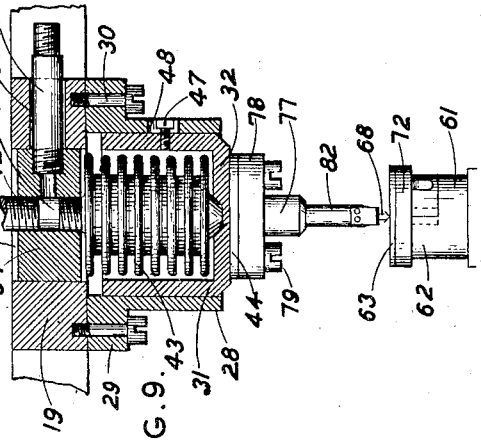
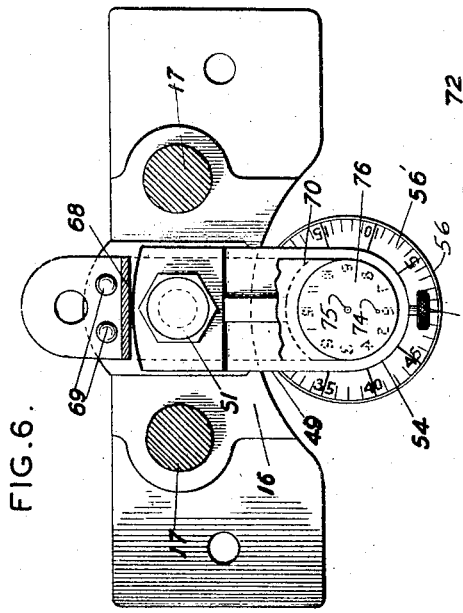
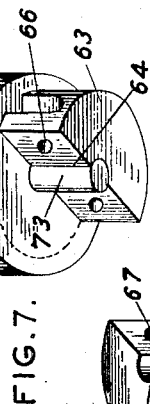
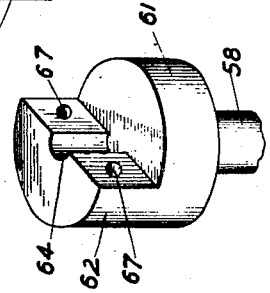
Inventor
HENRY KERSHAW May 18, 1948. H. KERSHAW 2,441,886
WELDING MACHINE
Filed Nov. 26, 1946 4 Sheets-Sheet 4
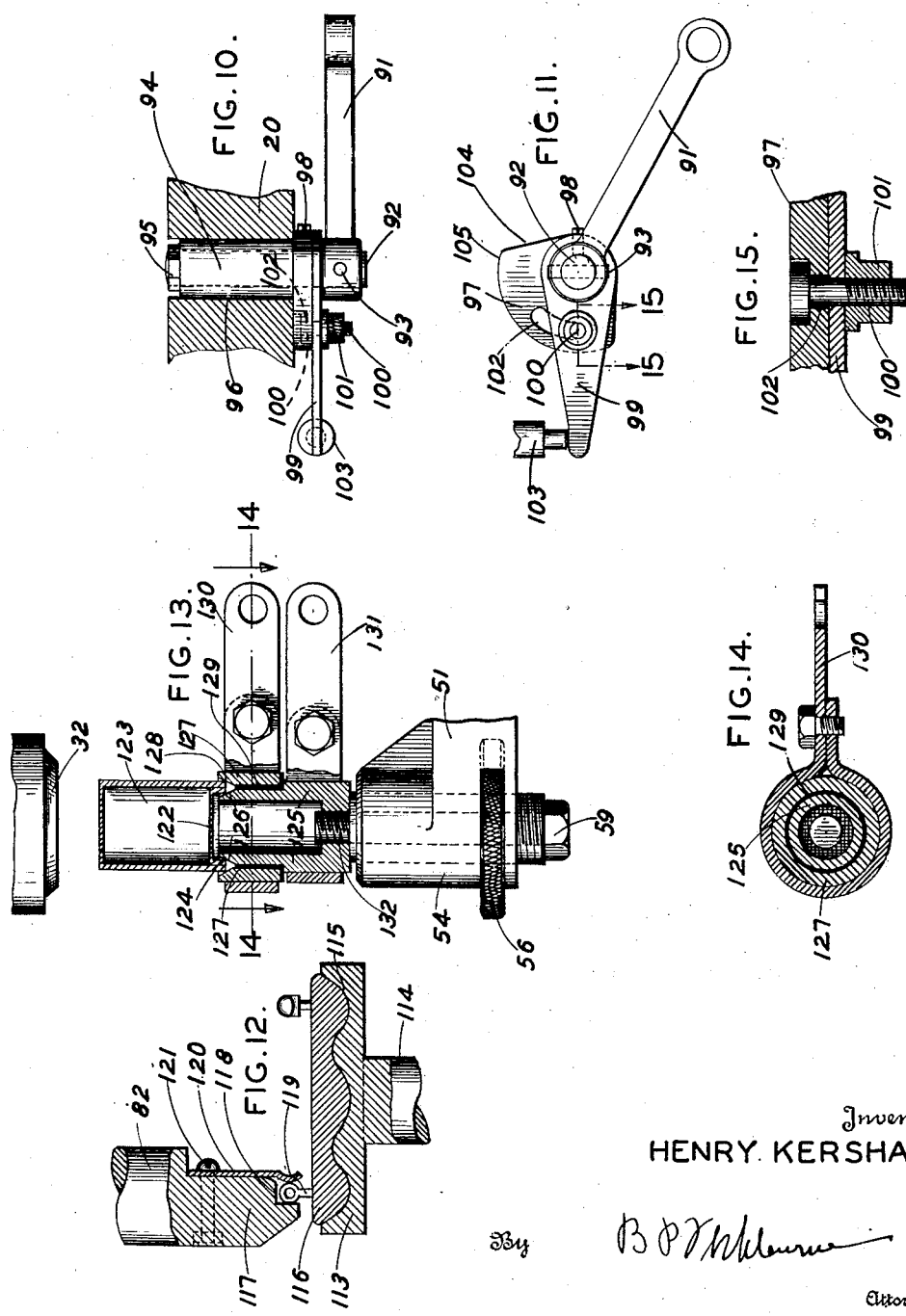
Inventor
HENRY KERSHAW
By B P McClure
Attorney Patented May 18, 1948

2,441,886

UNITED STATES PATENT OFFICE 2,441,886

WELDING MACHINE

Henry Kershaw, Belleville, N. J.

Application November 26, 1946, Serial No. 712,375

11 Claims. (Cl. 219—4)

1

My invention relates to a welding machine.

An important object of the invention is to provide a machine of the above mentioned character, which is well adapted for welding small parts, such as pins to watch dials, or parts of jewelry.

A further object of the invention is to provide a device of the above mentioned character, which is manually operated for bringing a part to be welded into contact with the companion part, while maintaining a yielding pressure upon such parts, which pressure follows through during the welding period.

A further object of the invention is to provide means to automatically shift the manual lever, when released, to the inactive position, to cause the high part of the cam to release the carriage for return movement.

A further object of the invention is to provide means for holding one part to be welded, which means is adjustable circumferentially and radially with respect to the companion part.

A further object of the invention is to provide a machine of the above mentioned character which is of simplified construction and convenient to operate.

Other objects and advantages of the invention will be apparent during the course of the following description.

In the accompanying drawings, forming a part of this application, and in which like numerals are employed to designate like parts throughout the same, Figure 1 is a front elevation of the apparatus embodying my invention, Figure 2 is a side elevation of the same, parts broken away, and parts in vertical section, Figure 2a is a vertical section taken on line 2a—2a of Figure 2, Figure 3a is a bottom plan view of the pin holder electrode, Figure 3 is a plan view of the apparatus, Figure 4 is a horizontal section taken on line 4—4 of Figure 5, Figure 5 is a vertical section taken on line 5—5 of Figure 2, Figure 6 is a horizontal section taken on line 6—6 of Figure 5, Figure 7 is an exploded perspective view of the dial holder electrode and associated elements, Figure 8 is a rear elevation of the apparatus, parts broken away, showing the operating lever and associated elements, Figure 9 is a view similar to Figure 5, showing the pin holder electrode in the lowered welding position, Figure 10 is a plan view of the operating lever, the cross-head being shown in section, Figure 11 is a side elevation of the operating lever, Figure 12 is a vertical section through a slightly different form of work holder electrode, Figure 13 is a central vertical section through a further modified form of work holder electrode, Figure 14 is a horizontal section taken on line 14—14 of Figure 13, and, Figure 15 is a detailed section taken on line 15—15 of Figure 11.

In the drawings, wherein for the purpose of illustration is shown a preferred embodiment of my invention, the numeral 15 designates a base, having a raised portion 16 upon which is rigidly mounted vertical spaced posts 17, and a horizontal cross-head 18 is rigidly mounted upon the upper ends of the posts 17. The numeral 19 designates a horizontal vertically movable carriage or slide, having a rear portion 20, provided with openings 21, slidably receiving the vertical posts 17. The rear portion 20 carries depending sleeves 22, slidable upon the posts 17, and these sleeves are moved upwardly by compressible coil springs 23, surrounding the posts 17, and having their lower ends engaging stop sleeves 24. These stop sleeves are vertically adjustably mounted upon the posts 17 and are adapted to be clamped thereto by set screws 25. The sleeves 24 are rigidly connected with a horizontal bar 26, having a binding post 27 secured thereto, for connection with one side of a welding circuit.

Arranged beneath the carriage 19 is a vertical guide sleeve or cylinder 28, provided at its top with a thick flange 29, secured to the carriage 19 by bolts 30, or the like. Mounted to slide and move vertically within the guide sleeve 28 is an inner sleeve or cylinder 31, the upper end of which is open, and the lower end of which is closed by a head 32. The carriage 19 has a central cylindrical opening 33, receiving a block 34, preferably having a press fit therein. This block has a vertical port 35 and a horizontal port 36, which communicate. The carriage 19 has a radial opening 37, receiving a tubular coupling 38, the inner end of which communicates with the port 36, and has screw threaded engagement with the carriage 34, as shown at 39. The coupling 38 is to be connected with a tank (not shown) as a source of compressed air. Instead of using the tank, the coupling 36 may be connected with the hose of a bicycle pump, and compressed air is thereby forced into the bellows 43. When this is done, a check valve is arranged within the coupling 36, to open inwardly. This may be a check valve similar to those used upon inner tubes for automobile tires. Arranged above the carriage 19 is a pressure guage 40, supported upon a ring 41, engaging the top of the carriage 19. This pressure guage carries a depending tubular coupling 42, which is threaded, and engages within one end of the port 35. Arranged within the inner sleeve or cylinder 31 is a longitudinally extensible and contractable metal bellows 43, the lower end of which is closed and has an extension 44, engaging in a recess 45, in the head 32. The upper end of the bellows 43 is connected with a tubular coupling 46, having screw threaded engagement within the lower end of the vertical port 35. Connected with the inner sleeve or cylinder 31 is a stop element or screw 47, extending radially outwardly beyond the same and engaging within a vertical slot 48, formed in the guide sleeve 29. The coupling 38 is connected with a suitable source of pressure, as stated, such as compressed air under a desired pressure, which may be four pounds to the square inch. This pressure is indicated by the guage 40 and the pressure passes into the metal bellows 43, which is distended, whereby the sleeve or cylinder 31 moves downwardly with respect to the sleeve 28, to the limit of its travel, when stop 47 engages the lower end of the slot 48.

Arranged above and adjacent to the raised base portion 16 is a horizontal bracket 49, having a vertical opening 50 formed in one end thereof, for pivotally receiving a vertical pivot element or bolt 51, the lower end of which engages within a screw threaded opening 52, formed in the raised portion 16. The bracket 49 is thoroughly insulated from the bolt 51 and the portion 16, by insulating material 53 including a horizontal insulating plate 53'. At its forward end, the bracket carries a vertical sleeve 54. The bracket 49 and sleeve 54 are provided near the bottom of the sleeve 54 with a horizontal opening 55, receiving an adjusting nut 56, having screw threaded engagement with a vertical adjustable inner sleeve 57, having no screw threaded engagement with the sleeve 54. The sleeve 57 may be clamped in the vertical position by a set screw 57'. The threads upon the nut 56 and inner sleeve are twenty to the inch and this will move the inner sleeve 57 vertically fifty-thousandths of an inch (.050 inch) for each revolution of the nut 56. The top of the nut 56 is provided with a micrometer scale 56', to coact with the stationary pointer 56a. This scale is graduated with fifty lines, each line representing a .001 inch adjustment of the sleeve 57. Rotatable within the vertical adjustable sleeve 57 is a vertical bolt or shaft 58, having a head 59 at its lower end. The upper end of this bolt 58 has screw threaded engagement within an opening 60 formed in the cylindrical base 61 of a socket. This socket includes a stationary jaw 62, formed upon the base 61 and an adjustable jaw 63, to be arranged above the base 61, these jaws having circularly curved recesses 64. The jaw 63 is connected with the jaw 62 by screws or bolts 65, extending through openings 66 in the jaw 63 and having screw threaded engagement within openings 67, formed in the jaw 62.

A flat electric conductor 68 is mounted upon the insulating plate 53' and is attached thereto by a pin or rivet 69, and is connected with the opposite side of the welding circuit. This conductor passes between the posts 17 and is free from contact therewith and has a horizontal portion 70, provided with an opening 71, receiving the bolt 58. The conductor is adapted to be clamped between the base 61 and the vertically adjustable sleeve 57. It is thus seen that when the bolt 58 is screwed up tight, the base 61 is clamped against the conductor 70 which is clamped against the sleeve 57 and the base 61 is held against turning movement. When the bolt 58 is unscrewed sufficiently, this bolt and the base 61 may be turned with respect to the vertical adjustable sleeve 57.

The numeral 72 designates a dial holder electrode which is in the form of a horizontal disc, having a depending cylindrical pin 73, rigidly secured thereto. This pin is concentric with the disc and is adapted for insertion within the recesses 64 and is clamped therein, by manipulation of the bolts 65. The holder electrode 72 carries vertical pins 74 and 75, Figures 5 and 6, projecting above the same to pass through openings in the work, which is shown as a metallic watch dial 76. The pin 74 passes through the opening at the second hand and the pin 75 passes through the opening at the center of the dial 76. These pins hold the dial in place upon the holder electrode 72. The dial is inverted when placed upon the holder electrode 72.

The numeral 77 designates a tubular socket, carried by a head 78, secured to the head 32 by bolts 79. A flat conductor 80 is secured to the bar 26 and has a horizontal portion 81, arranged between the heads 32 and 78, clamped between the same, and having openings for the passage of the bolts 79.

The numeral 82 designates a pin holder electrode, in the form of a shank, adapted for insertion within the socket 77 and clamped therein by a set screw 83'. The shank 82, Figure 2a, has its lower end cut away providing a reduced extension 83, having a flat 84. This flat has a vertical groove 85 to receive the pin 86, which is to be welded to the dial 76. The lower end of this pin is pointed, as shown. Mounted upon the flat 84 is a spacing plate 87 and a leaf spring 88 is mounted upon the spacing plate and the lower end of this leaf spring engages with the pin 86 to hold it within the groove 85. The top of the pin butts against the shoulder 89. The spacing plate 87 and spring 88 are secured to the extension 83 by screws 90, or the like. It is thus seen that the pin 86 is inserted upwardly into the groove 85 and is held therein by the spring 88.

Manually operated means are provided for moving the carriage 19 downwardly. This means includes a vertically swinging manual lever 91, Figures 8, 10, and 11. This lever is mounted upon a shaft 92, and is rigidly secured thereto by a radial pin 93. The shaft 92 is rotatable within a sleeve 94, and has a head 95. This sleeve has a press fit within an opening 96, formed in the rear portion 20 of the carriage 19, Figure 10. Mounted upon the shaft 92, at the outer end of the sleeve 94, is a cam 97, and this cam is clamped to the shaft 92 by a set screw 98. A lever 99 has an opening for pivotally receiving the shaft 92, and this lever has an opening for receiving a bolt 100, carrying a nut 101. The bolt 100 is adjustably mounted within an elongated slot 102 formed in the cam 97. It is thus seen that the lever 99 may be angularly adjusted with respect to the shaft 92 and then locked in the selected adjusted position. The levers 99 and 91 turn as a unit. The lever 99 is arranged to engage a micro-switch 103. The cam 97 has a low part 104, which is inclined radially and a high part 105 which is concentric with the shaft 92. As shown in Figure 8, the numeral 106 designates a roller, arranged for coaction with the cam 97. This roller is mounted upon a fixed pin 107, carried by the stationary cross-head 18. Arranged beneath the lever 91 is a bracket 108, rigidly secured to the carriage portion 20. This bracket 108 carries apertured knuckles 109, slidably receiving a plunger 110. This plunger carries a transverse pin 111, engaging a compressible coil spring 112. When the lever 92 is moved downwardly and held in the lowermost position, it moves the plunger 110 downwardly and compresses the spring 112. When the lever 91 is released, the spring 112 moves the plunger upwardly, which in turn swings the lever 91 upwardly so that the high part 105 of the cam is moved from beneath the roller 106.

The operation of the machine is as follows:

The springs 23 normally retain the carriage 19 in the raised position, at which time the lever 91 is in the raised position, Figure 8. The metal watch dial 76 is now applied to the holder electrode 72 in the inverted position. The metal pin 86 is now inserted within the groove 85. The bracket 49 may be swung horizontally to radially adjust the dial 76 with respect to the pin 86, and by manipulation of the bolt 58, the socket including the base 61 may be turned upon the axis of the bolt 58, for circumferentially adjusting the dial with respect to the pin 86. The sleeve 57 may be raised or lowered, with respect to the bracket 49, by turning the nut 56. With the adjustments made, the lever 91 is swung downwardly, and the inclined low part 104 will engage the roller 106, thus moving the carriage 20 downwardly. The high part 105 of the cam 97 now passes beneath the roller 106 and the carriage 20 is now in the lowermost position, and is not moved further downwardly as the lever 91 continues to move downwardly, because the high part 105 is concentric with the shaft 92. When the carriage 19 is in the lowermost position, the pin 86 is brought into firm engagement with the dial 76, and the inner sleeve 31 is held against downward movement, before the outer sleeve 28 reaches the end of its downward movement, whereby the stop element 47 is spaced from the bottom of the slot 48. The bellows 43 is now compressed and the yielding pressure from the bellows holds the pin 86 into yielding engagement with the dial. As the lever 91 continues in its downward movement, the lever 91 contacts with the plunger 110 and forces it downwardly and the lever 99 operates the micro-switch 103. The micro-switch closes the welding circuit for a suitable length of time, such as a fraction of a second and then opens the circuit although the lever 91 may still be in the lowered position. In this welding circuit, current passes through the conductor 80, through the stem 82, pin 86, dial 76, and conductor 68, the micro-switch 103 being suitably connected in this circuit. When the tapered end of the pin 86 is plasticized, due to the welding action, the pressure within the bellows 43 causes the bellows to expand, and this pressure follows through during the welding action. After the lever 91 has been manually moved to the lowermost position, and the welding affected, it is released, and the spring actuated plunger 110 shifts the lever 91 upwardly sufficiently, so that its concentric high part 105 is brought from beneath the roller 106, after which the springs 23 automatically return the carriage 19 to the raised position.

In Figure 12, I have shown a modified form of work holder electrode. In this figure, the numeral 113 designates a work holder electrode in the form of a disc, corresponding to the element 72 and carried by a pin or shank 114 to be held within the recess 64. The disc 113 has a recess 115 formed therein, of a contour for receiving a piece of jewelry, such as a metal broach 116. The stem 82 has a reduced extension 117, corresponding to the extension 83 and having a recess 118 to receive a metal element 119 to be welded to the broach. This element is held in place by a leaf spring 120, secured to the extension 117 by a screw 121. All other parts of the machine remain identical with those shown and described in connection with the first form of the invention.

In Figures 13 and 14, I have shown apparatus for welding a cover 122 to a receptacle 123, the cover having a flange 124. This means comprises a tubular cylindrical electrode 125, having an upper beveled face 126 and an outer cylindrical electrode 127 having a beveled face 128, and these electrodes are insulated from each other, as shown at 129. A conductor 130 surrounds the electrode 127 and a similar conductor 131 surrounds the electrode 125. These conductors are connected with the opposite sides of the welding circuit and the micro-switch 103 is connected in the circuit. The conductors 68 and 80 are dispensed with. The socket including the base 61 is dispensed with and the electrode 125 has an opening 132 for receiving the upper screw threaded end of the bolt 58. The head 78 and shank 82 are omitted and the head 32 will be brought downwardly into engagement with the receptacle 123. All other parts of the apparatus remain identical with those shown and described in connection with the first form of my invention.

In the operation of the machine, in connection with the modification shown in Figures 13 and 14, the lower end of the receptacle 123 and the flange 124 are inserted between the beveled faces 126 and 128. When the lever 91 is moved downwardly, head 32 engages the receptacle 123 and forces it downwardly, the beveled faces cause the flange and receptacle to firmly contact, particularly at their outer ends. The bellows 43 is compressed and when the welding occurs, the pressure from the bellows follows through during the welding period.

All parts of the machine are preferably made of metal, except those stated to be made of insulating material.

Having thus described my invention, what I claim is:

1. A welding machine, comprising a support, a work holder electrode, means connected with the support to cause the electrode to move in a fixed path, a second work holder electrode, and means connecting the second work holder electrode with the support so that such second work holder electrode may be moved radially and circumferentially with respect to the path of travel of the first named electrode.

2. A welding machine, comprising a support, a work holder electrode, means connected with the support to cause the electrode to move in a fixed path, a pivoted bracket secured to the support, a second work holder electrode, means to rotatably mount the second work holder electrode upon the pivoted bracket, and means for connecting the electrodes in a welding circuit.

3. A welding machine, comprising a support including upstanding guide means, a carriage mounted upon the guide means to be raised and lowered, a work holder electrode mounted upon the carriage, a horizontally swinging bracket mounted upon the support and arranged beneath the electrode, an element mounted upon the bracket to be turned with relation thereto, a second work holder electrode mounted upon the element, and means for connecting the electrodes in a welding circuit.

4. A welding machine, comprising a support including upstanding guide means, a carriage mounted upon the guide means, means to move the carriage downwardly, a horizontally swinging bracket mounted upon the support beneath the carriage, an upstanding sleeve mounted upon the bracket, adjustable means to raise and lower the sleeve, an element rotatably mounted within the upstanding sleeve, a work holder electrode mounted upon the element, a second work holder electrode mounted upon the carriage, and means for connecting the electrodes in a welding circuit.

5. A welding machine, comprising a support including upstanding guide means, a carriage mounted upon the guide means, an outer sleeve mounted upon the carriage, an inner sleeve slidable within the outer sleeve, means to limit the movement of the inner sleeve with respect to the outer sleeve, a pneumatic element within the inner sleeve to move it in one direction, a work holder electrode mounted upon the inner sleeve, a horizontally swinging bracket arranged beneath the electrode and pivoted to the support, an upstanding sleeve carried by the bracket, means to vertically adjust the sleeve with respect to the bracket, a shaft extending through the sleeve and adapted to be turned therein, a second work holder electrode, means to mount the second work holder electrode upon the shaft, and means for connecting the electrodes in a welding circuit.

6. A welding machine, comprising a support including an upstanding guide, a carriage mounted upon the guide, means to move the carriage downwardly, a horizontally swinging bracket mounted upon the support beneath the carriage, an upstanding outer sleeve carried by the bracket, an upstanding inner sleeve mounted within the outer sleeve, a nut having screw threaded engagement with the inner sleeve and engaging the outer sleeve to vertically adjust the inner sleeve, an upstanding shaft mounted within the inner sleeve to be turned with relation thereto, electrode means having screw threaded engagement with the upper end of the shaft, and means mounted upon the carriage to exert pressure upon the parts being welded.

7. A welding machine, comprising a support including upstanding guide means, a carriage mounted upon the guide means, means to move the carriage, a horizontally swinging bracket mounted upon the support beneath the carriage and insulated from the support, an upstanding outer sleeve carried by the bracket, an upstanding inner sleeve within the outer sleeve, means to vertically adjust the inner sleeve with respect to the outer sleeve, an upstanding shaft mounted within the inner sleeve to turn therein, a work holder electrode device having screw threaded engagement with the upper end of the upstanding shaft, a conductor having an opening receiving the shaft and held between the inner sleeve and work holder electrode, a second work holder electrode, means to mount the second work holder electrode upon the carriage, and a conductor connected with the second work holder electrode.

8. A welding machine, comprising a support including upstanding guide means, a carriage mounted upon the guide means, means to move the carriage, a horizontally swinging bracket mounted upon the support beneath the carriage and insulated from the support, an upstanding outer sleeve carried by the bracket, an upstanding inner sleeve within the outer sleeve, means to vertically adjust the inner sleeve with respect to the outer sleeve, an upstanding shaft mounted within the inner sleeve to turn therein, a work holder electrode having screw threaded engagement with the upper end of the upstanding shaft, a conductor clamped between the inner sleeve and work holder electrode, an outer sleeve mounted upon the carriage, a movable inner sleeve within the outer sleeve and having a lower head, a pneumatic element engaging the head, a second work holder electrode, a second head carrying the second work holder electrode, a conductor arranged between the first named and second named heads, and means for connecting the first and second named heads and clamping the second named conductor between them.

9. A machine for welding pins to watch dials, comprising a metallic disc for supporting a metallic watch dial and serving as an electrode, a pin holder electrode, a vertically movable carriage, means to mount the pin holder electrode upon the carriage, means to connect the electrodes in a welding circuit, a fixed pin, a roller mounted upon the pin, a cam pivoted upon the carriage and having an inclined low part and a high part which is concentric with its pivot, the low and high parts being adapted to engage beneath the roller, and a lever connected with the cam to turn it.

10. A welding machine, comprising upstanding guide means, a carriage mounted upon the guide means to move longitudinally thereof, a relatively fixed element, a cam pivoted upon the carriage and having a low inclined part and a high part which is concentric with its pivot, the parts being adapted to be brought into engagement with the relatively fixed element, a manually operated lever connected with the cam to move it, a spring pressed plunger arranged to engage the lever when the high part of the cam engages the relatively fixed element, a work holder electrode mounted upon the carriage, and a second work holder electrode arranged in cooperative relation to the first named electrode.

11. A welding machine, comprising upstanding guide means, a carriage mounted upon the guide means to move longitudinally thereof, a relatively fixed element, a cam pivoted upon the carriage and having a low inclined part and a high part which is concentric with its pivot, the parts being adapted to be brought into engagement with the relatively fixed element, a manually operated lever connected with the cam to move it, a work holder electrode mounted upon the carriage, a second work holder electrode for coaction with the first named electrode, means for connecting the electrodes in a circuit including a micro-switch, a second lever connected with the first lever and angularly adjustable with relation thereto and arranged to operate the micro-switch, and means to return the first named lever to the starting position when the lever is released and the high part of the cam is engaging the relatively fixed element.

HENRY KERSHAW.

REFERENCES CITED

The following references are of record in the file of this patent:

UNITED STATES PATENTS

| Number | Name | Date |
| --- | --- | --- |
| 1,897,606 | Cole et al. | Feb. 14, 1933 |
| 2,167,925 | Chandler | Aug. 1, 1939 |
| 2,271,987 | Newell | Feb. 3, 1942 |
| 2,316,597 | Kershaw | Apr. 13, 1943 |
| 2,363,753 | Smith et al. | Nov. 28, 1944 |
| 2,385,710 | Kershaw | Sept. 25, 1945 |